(12) United States Patent
Liu et al.

(10) Patent No.: US 10,885,292 B2
(45) Date of Patent: Jan. 5, 2021

(54) SYSTEM, METHOD AND COMPUTER PROGRAM PRODUCT FOR POLLUTION SOURCE ATTRIBUTION

(71) Applicant: International Business Machines Corporation, Armonk, NY (US)

(72) Inventors: Liang Liu, Beijing (CN); Junmei Qu, Beijing (CN); Wen Jun Yin, Beijing (CN); Hong Zhou Sha, Beijing (CN); Wei Zhuang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 598 days.

(21) Appl. No.: 15/271,296

(22) Filed: Sep. 21, 2016

(65) Prior Publication Data
US 2018/0082199 A1    Mar. 22, 2018

(51) Int. Cl.
*G06K 9/00*    (2006.01)

(52) U.S. Cl.
CPC ............ *G06K 9/00* (2013.01); *G06K 9/0053* (2013.01); *G06K 9/0055* (2013.01); *G06K 9/00543* (2013.01)

(58) Field of Classification Search
CPC .... G06K 9/00543; G06K 9/00; G06K 9/0053; G06K 9/0055
See application file for complete search history.

(56) References Cited

U.S. PATENT DOCUMENTS

| 6,882,958 B2* | 4/2005 | Schmidt | G06F 17/17 702/179 |
|---|---|---|---|
| 6,985,081 B2* | 1/2006 | Wagner | G08B 17/10 169/60 |
| 2011/0172931 A1* | 7/2011 | Murthy | G16C 20/20 702/32 |

FOREIGN PATENT DOCUMENTS

| EP | 2199790 A1 * | 6/2010 | ............ G01J 3/0264 |
|---|---|---|---|
| WO | WO 2015/159101 A1 | 10/2015 | |
| WO | WO-2015159101 A1 * | 10/2015 | ............ G06Q 10/10 |

OTHER PUBLICATIONS

Gianluigi Ferrari, Mar. 31, 2014, Hindawi Publishing Corporation International Journal of Distributed Sensor Networks vol. 2014, Article ID 541360, 17 pages (Year: 2014).*
Mel, et al. "The NIST Definition of Cloud Computing". Recommendations of the National Institute of Standards and Technology. Nov. 16, 2015.
Dominguez, Federico, et al. "Towards an Environmental Measurement Cloud: Delivering Pollution Awareness to the Public". Hindawi Publishing Corporation, International Journal of Distributed Sensor Networks. vol. 2014, Article ID 541360, 17 pages.

* cited by examiner

*Primary Examiner* — Eric Nilsson
*Assistant Examiner* — Ahsif A. Sheikh
(74) *Attorney, Agent, or Firm* — Joseph Petrokaitis, Esq.; McGinn IP Law Group, PLLC

(57) ABSTRACT

A method, system, and computer program product, include identifying a plurality of pollution process sets and deter-
(Continued)

mining pollution sources based on pollution start times of target pollution processes with matched features in the plurality of pollution process sets within a time window.

17 Claims, 8 Drawing Sheets

SYSTEM, METHOD AND COMPUTER PROGRAM PRODUCT FOR POLLUTION SOURCE ATTRIBUTION

BACKGROUND

The present invention relates generally to a pollution source attribution method, and more particularly, but not by way of limitation, to a system, method, and computer program product for determining pollution sources based on pollution start times of target pollution processes with matched features in the plurality of pollution process sets within a time window.

Nowadays environmental pollution, especially air pollution in an urban area, becomes a big issue. In order to manage the environmental pollution, pollution source attribution is one of the most essential technologies. Generally, the pollution source attribution refers to tracing a source of pollution and carrying out source apportionment to analyze influence of emission from each source.

Currently the pollution source attribution may be based on emission inventories and dispersion models. The emission inventory may list a number of emission sources (which is also referred to as pollution source) and related emission information. By means of the dispersion models, contribution to total pollution level in the urban area by the emission sources may be analyzed based on the emission information of the emission sources and observation of the total pollution level. Therefore with the number of the emission sources increase, the time for the pollution source attribution will increase dramatically and thus efficiency of the pollution source attribution would be decreased.

SUMMARY

In an exemplary embodiment, the present invention can provide a computer-implemented method including identifying a plurality of pollution process sets and determining pollution sources based on pollution start times of target pollution processes with matched features in the plurality of pollution process sets within a time window.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
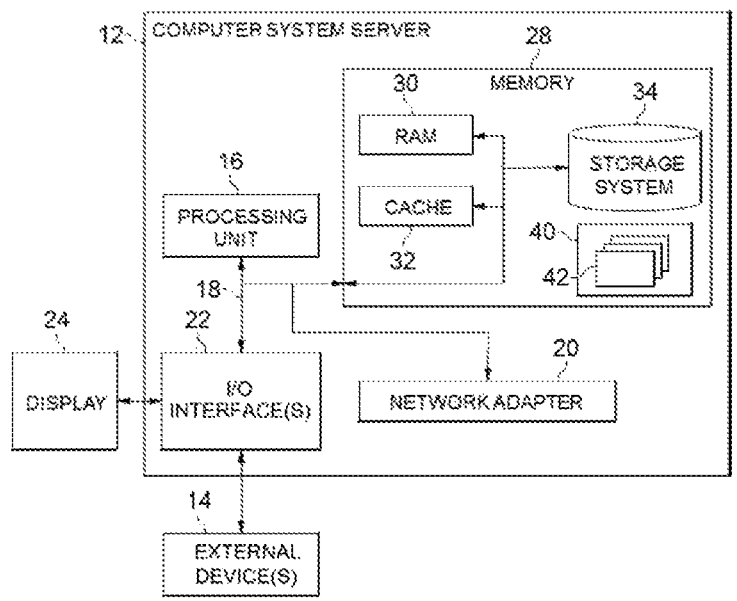
FIG. 1 depicts a cloud computing node 10 according to an embodiment of the present invention.

The invention will now be described with reference to FIG. 1-14, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 2:
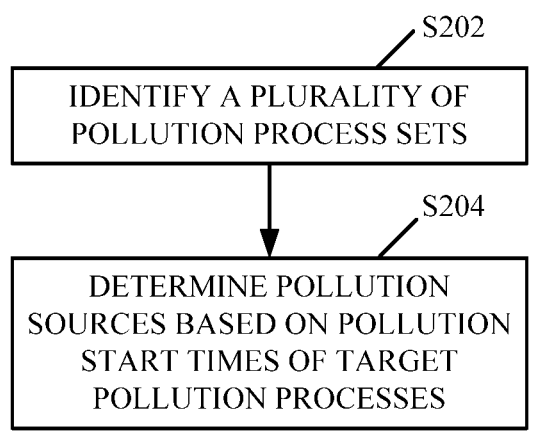
FIG. 2 is a schematic flowchart of the method for pollution source attribution according to an embodiment of the present invention.

As shown in at least FIG. 1, one or more computers of a computer system 12 according to an embodiment of the present invention can include a memory 28 having instructions stored in a storage system to perform the steps of FIG. 2.

Although one or more embodiments (see e.g., FIGS. 1 and 13-14) may be implemented in a cloud environment 50 (see e.g., FIG. 13), it is nonetheless understood that the present invention can be implemented outside of the cloud environment.

FIG. 2 shows a schematic flowchart of the method for pollution source attribution according to an embodiment of the present invention. The embodiment will be described in detail in conjunction with the figure. The method may be performed by the computer system/server 12 as shown in FIG. 1.

Generally a pollution source means a source which emits or discharges harmful substance to the natural environment to result in pollution. The pollution source may be an air pollution source, or a water pollution source, or any other type of pollution source. The following embodiments of the present invention will be directed to the air pollution sources, but a person skilled in the art will appreciate that the embodiments are also applicable to the water pollution sources or other type of pollution source.

The pollution sources may be located in or near a geographical region. The geographical region may be an entire area of a city, or an urban area of a city, etc. The determination of the pollution sources may be performed based on pollution concentration observations in the geographical region during a period of time. In general, the pollution concentration observation may contain a pollution concentration value and observation time. The pollution concentration may be mass concentration of a pollutant or volume concentration of a pollutant. Usually there is a plurality of observation stations located at different locations in the geographical region. These observation stations may observe the pollution concentration value within their coverage areas at a time interval. The time interval may be, for example, several tens of minutes, one or several hours, etc. The pollution concentration observations by the observation station may reflect a change of the pollution with the time in the coverage area of the observation station, which is referred to as an observation area. The change of the pollution may include accumulation of the pollution and dispersal of the pollution. In the embodiment, the accumulation of the pollution may be represented by a pollution process.

In the embodiment, the determination of the pollution source is based on the fact that, for the pollution in the geographical region, the pollution source(s) in or near the geographical region which is located where the pollution concentration increases early will be considered as the main pollution source(s) resulting in the pollution.

As shown in FIG. 2, at step S202, the computer system may identify a plurality of pollution process sets based on a plurality of groups of pollution concentration observations from a plurality of observation stations. In the embodiment of the present invention, the pollution process is a process in which the pollution concentration is increasing with the time. A person skilled in the art will appreciate that the pollution process may be expressed as a curve or in any other form. As described above, the pollution concentration observations may reflect the change of pollution with the time in the observation area of the observation station. Therefore the pollution process may be identified from the pollution concentration observations.

Figure 3:
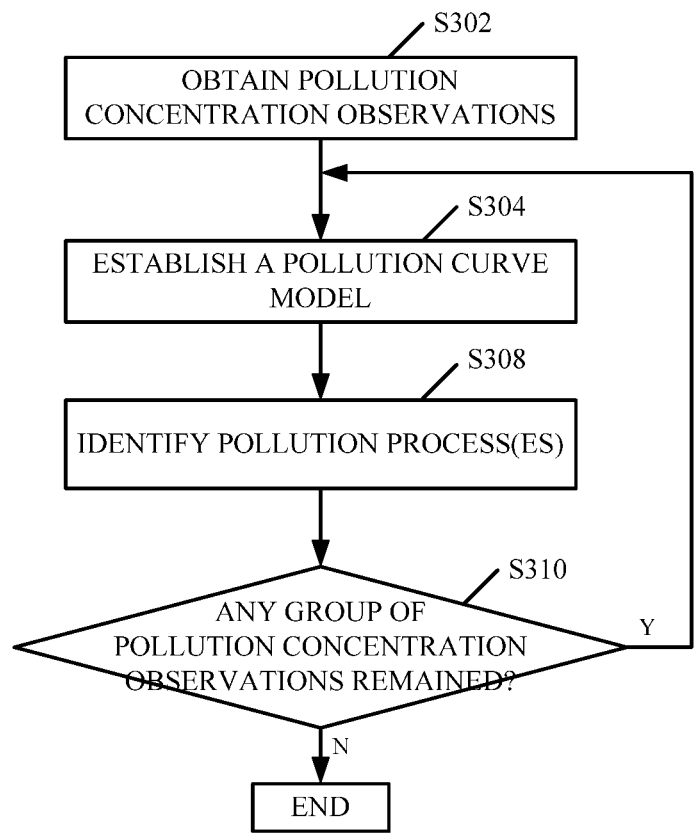
FIG. 3 is a schematic flowchart of an exemplary process of identifying a plurality of pollution process sets.
Figure 4:
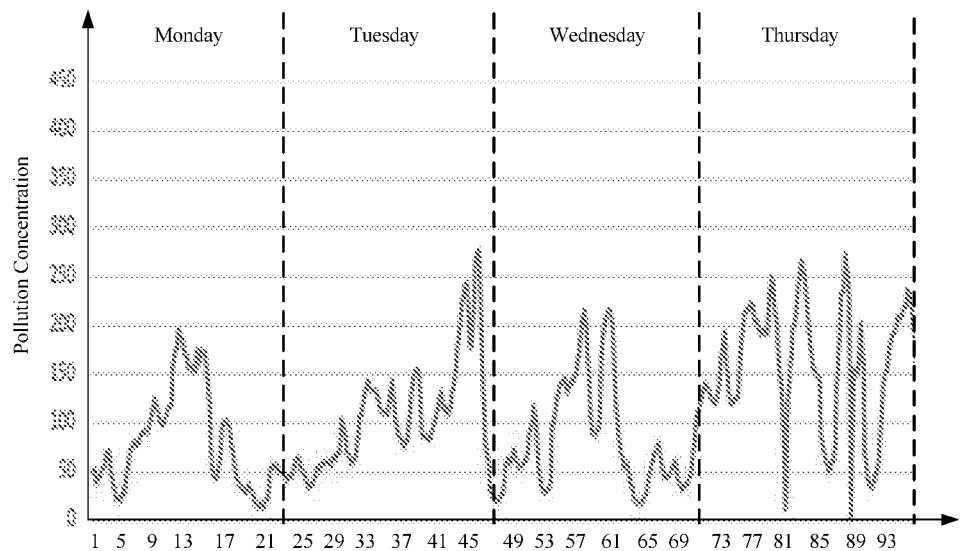
FIG. 4 illustrates an exemplary diagram of a pollution monitoring curve consisting of the pollution concentration observations.

FIG. 3 illustrates an exemplary process of identifying the plurality of pollution process sets (step S202). As shown in FIG. 3, at step S302, the computer system may obtain from each of the observation stations a group of pollution concentration observations. These groups of pollution concentration observations are observed during the same observation period by the observation stations. The observation period may be set as one or several days, one or several weeks, etc. The pollution concentration observation may include the pollution concentration value and the observation time. For example, the computer system may obtain a group of the pollution concentration observations from Monday to Thursday observed by each observation station. Assume that the observation station observes the pollution concentration values hourly. Then the group of the pollution concentration observations observed by the observation station includes 96 pollution concentration values and 96 observation times. FIG. 4 shows an exemplary pollution monitoring curve at the observation station. The identification of the pollution process set will be performed on each of the plurality of groups of pollution concentration observations.

At step S304, the computer system may establish a pollution curve model according to one of the groups of pollution concentration observations from the observation station. The pollution curve model describes a relationship between the pollution concentration value and the time.

In an embodiment of the invention, the computer system may establish a pollution curve model by performing curve fitting on the group of pollution concentration observations. As is known, the curve fitting is to determine a curve function to approximate a group of observed data (x, y), and the curve function y=f(x) describes a relationship between the two variables x, y. In this step, a kind of curve function may be selected firstly. The curve function may be selected arbitrarily or according to a distribution of the group of pollution concentration values. For example, the curve function with an expression of $y=a_N x^N + a_{N-1} x^{N-1} + \ldots + a_2 x^2 + a_1 x + c$ may be selected, where y represents the pollution concentration value, x represents the time, $a_N, a_{N-1} \ldots a_2, a_1$ and c are parameters of the curve function, and N is a natural number. This curve function has a degree of N. Then the group of pollution concentration values and the corresponding time are used to estimate the values of the parameters (i.e. $a_N, a_{N-1} \ldots a_2, a_1$ and c) of the selected curve function. In an embodiment, the estimation of the parameter values may be based on Least Square method. A person skilled in the art will appreciate that any other method for parameter estimation may be used. Upon the estimation of the parameter values, the pollution curve model is established.

In some embodiments of the present invention, prior to the curve fitting, a de-noising processing may be performed on the group of pollution concentration values to remove the noise. The de-noising processing is well known in the art, and a person skilled in the art will appreciate that any existing de-noising algorithm may be employed.

After establishing the pollution curve model, the computer system may identify the pollution process(es) based on the pollution curve model at step S308.

Figure 5:
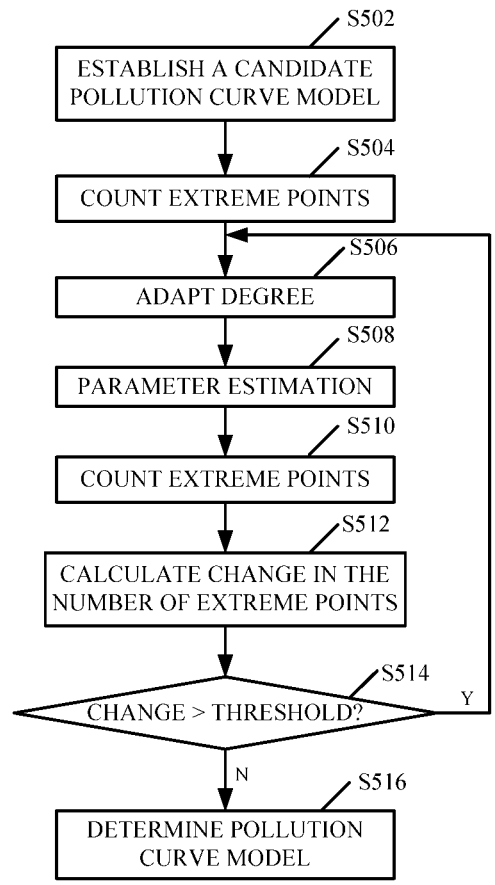
FIG. 5 is a schematic flowchart of an exemplary process of establishing a pollution curve model.

In another embodiment of the invention, in order to improve accuracy of the pollution curve model, the computer system may establish the pollution curve model in a manner of iteration. FIG. 5 illustrates an exemplary process of establishing the pollution curve model (step S304). As shown in FIG. 5, at step S502, the computer system may establish a candidate pollution curve model with a given degree. The candidate pollution curve model may also be established by means of the curve fitting. At step S504, the computer system may count extreme points of the candidate pollution curve model. Generally the extreme point may include a peak point and/or a valley point. The extreme point of the candidate pollution curve model may be calculated from the expression of the candidate pollution curve model. The calculation of the extreme point is well known in the art and thus its detailed description is omitted herein. In some embodiments of the present invention, either the peak points or the valley points are counted. In another embodiment, both the peak points and the valley points are counted. The number of the extreme point(s) may indicate the times of the accumulation and/or dispersal of the pollution.

Then at step S506, the computer system may adapt the degree of the candidate pollution curve model. Usually the given degree may be set low, and thus the degree may be incremented in this step. In the above example, the given degree is set to 2, and the candidate pollution curve model is expressed as $y=a_2 x^2 + a_1 x + c$. Then the degree of the candidate pollution curve model may be incremented by 1, for example. Thus the adapted candidate pollution curve model is expressed as $y=a_3' x^3 + a_2' x^2 + a_1' x + c'$, where $a_3'$, $a_2'$, $a_1'$ and $c'$ are the parameters.

A person skilled in the art will appreciate that the degree of the candidate pollution curve model may be decremented dependent upon the setup of the given degree. Usually if the given degree is set high, the degree may be decremented in the step of the degree adaption.

At step S508, the values of the parameters of the adapted candidate pollution curve model may be estimated based on the same group of pollution concentration observations. Similarly, the estimation of the parameter values may be based on Least Square method. Upon the estimation of the parameter values, the adapted candidate pollution curve model is established.

Figure 6:
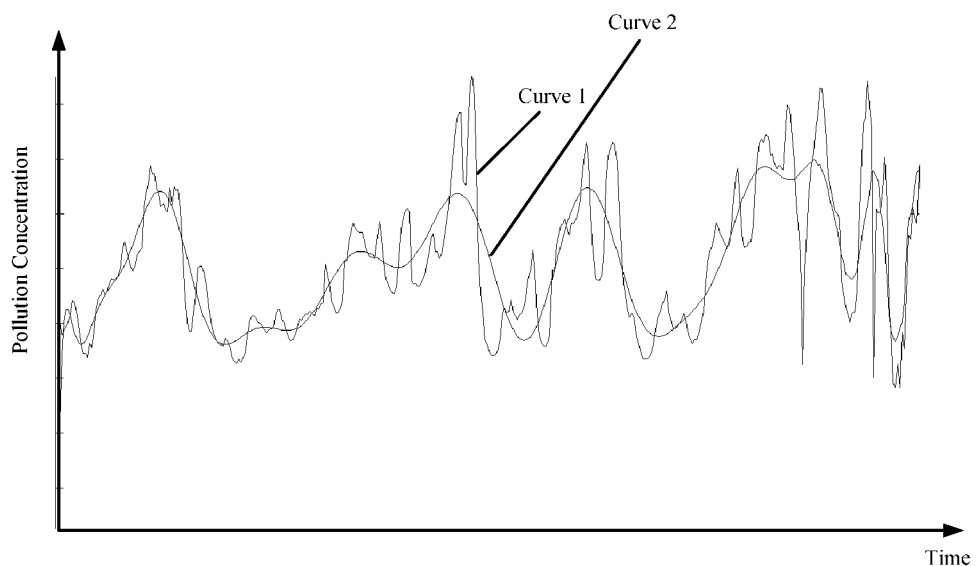
FIG. 6 is a diagram illustrating the fitting curve.

At step S510, the computer system counts the extreme points of the adapted candidate pollution curve model. The same type of the extreme point as that in step S504 may be counted. Then at step S512, the computer system may calculate a change in the number of the extreme points. In this step, the change may be calculated as a difference between the number of the extreme points of the adapted candidate pollution curve model and the number of the extreme points of the previous candidate pollution curve model. Then the computer system compares the change with a threshold at step S514. The threshold may be predetermined as needed. If the change is greater than the threshold, it indicates that the current candidate pollution curve model does not approximate the group of pollution concentration values appropriately. Then the process proceeds to step S506 in which the degree is adapted again. Then steps S508 to S514 are performed again. If the change is less than or equal to the threshold, it indicates that the both candidate pollution curve models can approximate the group of pollution concentration values appropriately. Then the computer system may determine either of the candidate pollution curve model and the adapted candidate pollution curve model as the pollution curve model at step S516. In some embodiments of the present invention, at step S516, the candidate pollution curve model with the lower degree may be determined as the pollution curve model. FIG. 6 shows the fitting curve based on the pollution concentration observations, in which curve 1 represents the pollution monitoring curve and curve 2 represents the fitting curve.

Return to FIG. 3, at step S308, the computer system may identify the pollution process(es) based on the established pollution curve model to form the pollution process set. As described above, the pollution process indicates the accumulation of the pollution. Therefore in the embodiment, the pollution process may start from a valley point and end at a peak point following the valley point. According to the peak point(s) and the valley point(s), the pollution process(es) can be identified. The time of the valley point of the pollution process may be considered as a pollution start time of the pollution process, and the time of the peak point of the pollution process may be considered as a pollution end time of the pollution process.

Figure 7:
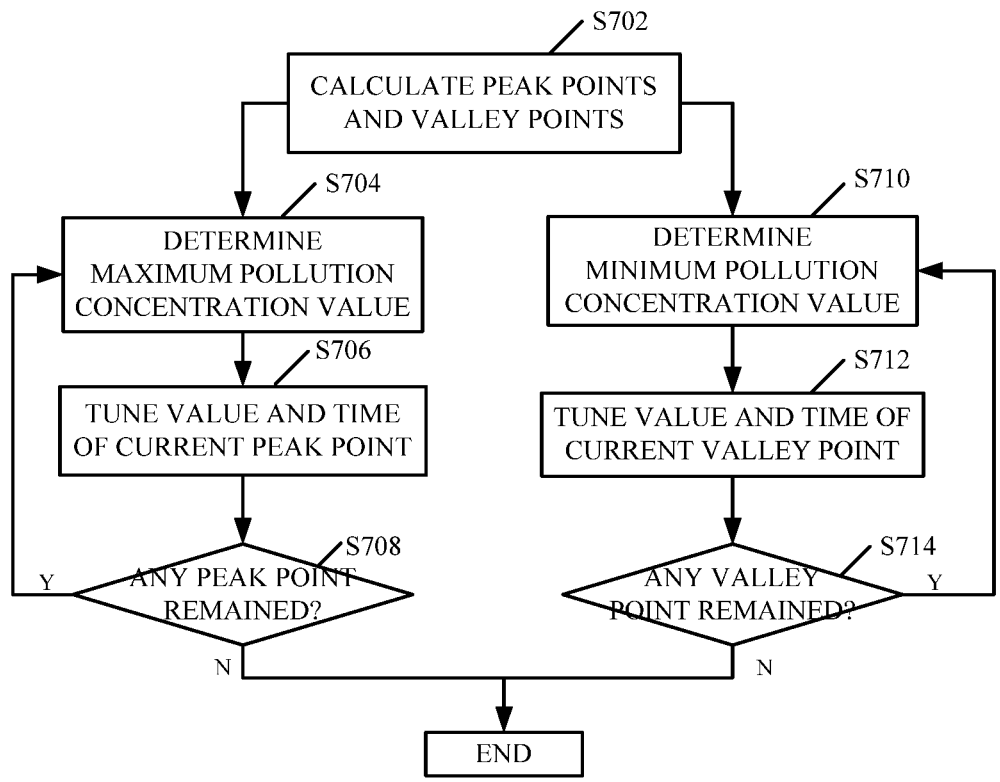
FIG. 7 is a schematic flowchart of an exemplary process of tuning peak point(s) and valley point(s) of the pollution curve model.

Further, in order to improve the accuracy of the pollution start time of the pollution process, in step S308, the computer system may tune the peak point(s) and valley point(s) of the pollution curve model established by step S304. As described above, the pollution curve model is the approximation to the group of pollution concentration observations, and thus the peak point(s) or valley point(s) of the pollution curve model may be inconsistent with the real peak point(s) or valley point(s). In order to acquire accurate time for a pollution process, the peak point(s) and valley point(s) of the pollution curve model shall be tuned to be consistent with the real peak point(s) and valley point(s). FIG. 7 illustrates an exemplary process of tuning the peak point(s) and valley point(s) of the pollution curve model (step S306). Upon the determination of the pollution curve model, all the peak point(s) and valley point(s) of the pollution curve model may be calculated from the curve equation of the pollution curve model at step S702. Each of the peak point(s) and the valley point(s) may have a value and time.

Then at step S704, for one of the peak points (i.e. current peak point), the computer system may determine a maximum pollution concentration value in the group of pollution concentration observations corresponding to the pollution curve model within a time period from the previous valley point of the current peak point to the next valley point. In this step, once the previous and next valley points of the current peak point and their time are obtained, the time period from the previous valley point to the next valley point may be determined accordingly. Then the maximum pollution concentration value in the group of pollution concentration observations within the determined time period may be determined. Then at step S706, the computer system may tune the value of the current peak point to the maximum pollution concentration value, and tune the time of the current peak point to the observation time of the maximum pollution concentration value. At step S708, it is checked whether there remains any peak point of the pollution curve model. If there remains the peak point, the process returns to step S704. If there is no peak point, the tuning process for the peak point(s) ends. Through the above operations, the peak point(s) of the pollution curve model may be consistent with the real peak point(s).

At step S710, for one of the valley points (i.e. current valley point), the computer system may determine a minimum pollution concentration value in the group of pollution concentration observations corresponding to the pollution curve model within a time period from the previous peak point of the current valley point and the next peak point. In this step, once the previous and next peak points of the current valley point and their time are obtained, the time period from the previous peak point to the next peak point may be determined accordingly. Then the minimum pollution concentration value may be determined from the pollution concentration observations within the determined time period. Then at step S712, the computer system may tune the value of the current valley point to the minimum pollution concentration value, and tune the time of the current valley point to the observation time of the minimum pollution concentration value. At step S714, it is checked whether there remains any valley point of the pollution curve model. If there remains the valley point, the process returns to step S710. If there is no valley point, the tuning process for the valley point(s) ends. Through the above operations, the valley point(s) of the pollution curve model may be consistent with the real valley point(s).

It should be noted that the tuning process for the peak point(s) (which comprises steps S704 to S708) and the tuning process for the valley point(s) (which comprises steps S710 to S714) may be performed sequentially or concurrently. In FIG. 7, the two tuning processes are performed concurrently.

Further the computer system may arrange the identified pollution process(es) in chronological order in the pollution process set. Each pollution process set may include all the pollution processes which occurred in the observation region during the observation period.

Then at step S310, it is checked whether there remains any group of pollution concentration observations. If there remains the group of pollution concentration observations, the process returns to step S304. If there is no group of pollution concentration observations, the process ends.

Return to FIG. 2, at step S204, the computer system may determine pollution sources based on pollution start times of target pollution processes with matched features in the plurality of pollution process sets within a time window. In the embodiment, the time window refers to a time period of interest, and may be set appropriately. Usually the setting of the time window may take propagation characteristic of the pollution into account, and the time window is not longer than a duration of the pollution. For example, the time window may be set as the time period in a day or a week during which the pollution is heaviest. In the embodiment, if a similarity between two pollution processes is greater than a predetermined threshold, it may be determined that the two pollution processes have the matched features. In some embodiments of the invention, the similarity may be determined based on the pollution curve corresponding to the pollution process. Specifically, the determination of the similarity may be based on a feature of the pollution curve, such as a curve form, a curve slope, etc. It should be noted that a person skilled in the art will appreciate that any other method for determining whether the pollution processes have the matched features may be used. In this step, a plurality of pollution sources may be determined from the pollution sources which are located within the coverage areas of the observation stations according to the pollution start times of the target pollution processes. As described above, the observation stations may be located at different locations of the geographical region, and their coverage areas may cover the geographical region. Therefore the pollution sources located within the geographical region may be classified to determine the pollution sources which mainly contribute to the pollution. Usually the pollution sources located within the geographical region may be listed in an emission inventory. The emission inventory may also include location information and emission information of the pollution sources. The location information may include, for example, an address of the pollution source, or any information indicating that the pollution source is located within the coverage area of which observation station. The emission information may include emission amount of the pollution source, pollutant type, etc.

Figure 8:
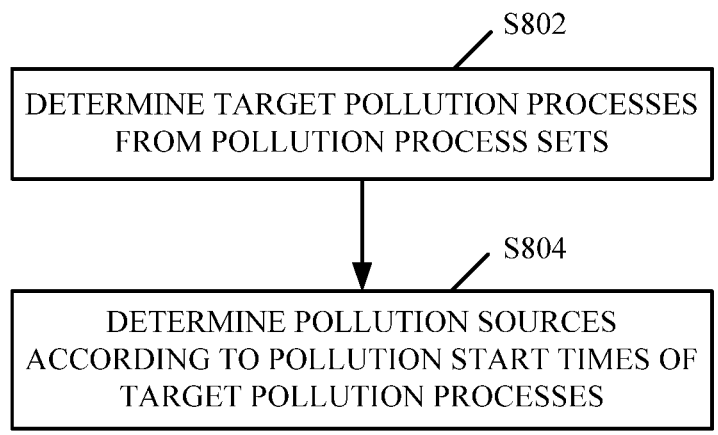
FIG. 8 is a schematic flowchart of an exemplary process of determining the pollution sources.

FIG. 8 illustrates an exemplary process of determining the pollution sources (step S204). As shown in FIG. 8, at step S802, the computer system may determine the target pollution processes which occurred within the time window and have the matched features from the plurality of pollution process sets. As described above, each pollution process set may include all the pollution processes which occurred in the coverage area of each observation station during the same observation period. With respect to the pollution in the geographical region during a time period, only the pollution processes which occurred during the same time period may reflect this pollution.

In step S802, for each of the pollution process sets, the computer system may determine the pollution process(es) which overlaps with the time window as candidate pollution process(es). As described above, the pollution process may start from the valley point and end at the peak point. The pollution process which overlaps with the time window may include the pollution process of which the pollution start time falls within the time window and the pollution end time falls outside the time window, or the pollution process of which both the pollution start time and pollution end time fall within the time window, or the pollution process of which the pollution end time falls within the time window and the pollution start time falls outside the time window. Then the computer system may determine the target pollution processes having the matched features from the candidate pollution processes. The target pollution processes each belongs to different pollution process set. In the determination, the similarity between the candidate pollution processes of different pollution process sets may be calculated, and the target pollution processes may be determined based on the calculated similarity. Then the computer system may obtain the pollution start times of the target pollution processes.

Then at step S804, the computer system may determine the pollution sources based on the pollution start times of the target pollution processes determined by step S802. The pollution start time of the pollution process indicates the time at which the pollution concentration starts to increase, and accordingly indicates the time at which the observation station starts to observe the increase of the pollution concentration. The earlier the pollution start time of the pollution process is, the earlier the observation station associated with the pollution process observes the increase of the pollution concentration, and thus the more significant the influence of the pollution source(s) located within the coverage area of the observation station on the pollution is.

Figure 9:
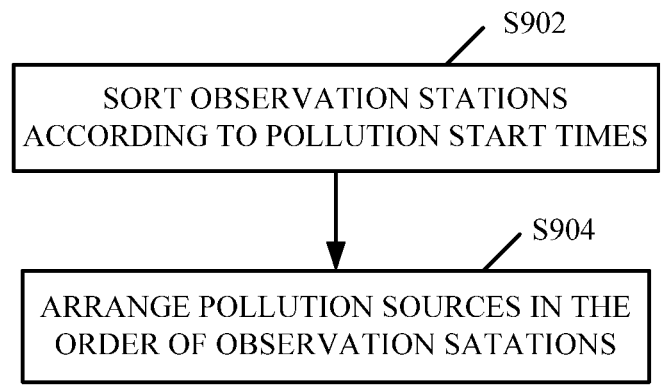
FIG. 9 is a schematic flowchart illustrating an exemplary process of determining the pollution sources.

FIG. 9 illustrates an exemplary process of determining the pollution sources. As shown in FIG. 9, at step S902, the computer system may sort the observation stations according to the pollution start times of the target pollution processes determined at step S802. In the embodiment, the observation stations may be arranged in the order of the pollution start times. The earlier the pollution start time of the pollution process is, the higher rank the corresponding observation station is arranged at. Further the observation stations corresponding to the same pollution start time may be arranged at the same position. Then at step S904, the computer system may arrange the pollution sources located within the coverage areas of the observation stations in the order of the plurality of observation stations. The pollution sources may be obtained from the emission inventory according to the locations of the observation stations. The higher position the observation station is arranged at, the more contribution the pollution sources within the coverage area of the observation station made to the pollution, and thus the higher priority the pollution source is assigned with. The pollution sources located within the coverage areas of the observation stations arranged at the same position may be assigned with the same priority.

Figure 10:
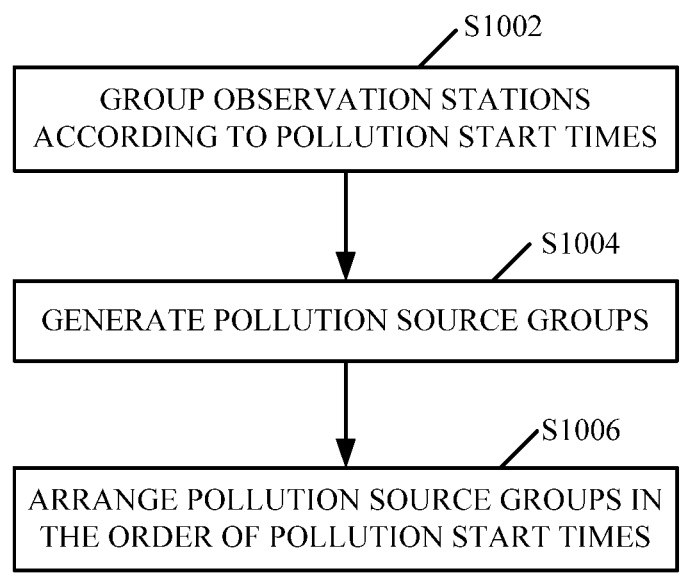
FIG. 10 is a schematic flowchart illustrating another exemplary process of determining the pollution sources.

FIG. 10 illustrates another exemplary process of determining the pollution sources. As shown in FIG. 10, at step S1002, the computer system may group the observation stations associated with the target pollution processes determined at step S802 into multiple groups of observation stations according to the pollution start times of the target pollution processes. Each group may include the observation stations corresponding to the same pollution start time. Then at step S1004, the computer system may generate a pollution source group for each group of observation stations. The pollution source group may include the pollution sources located within the coverage areas of the observation stations in the corresponding group of observation stations. In this way, each pollution source group may include the pollution sources corresponding to the same pollution start time. At step S1006, the computer system may arrange the pollution source groups in the order of the pollution start times of the target pollution processes. The earlier the pollution start time is, the higher priority the pollution source group corresponding to the pollution start time is assigned with. Accordingly the higher priority the pollution sources in the pollution source group are assigned with.

Figure 11:
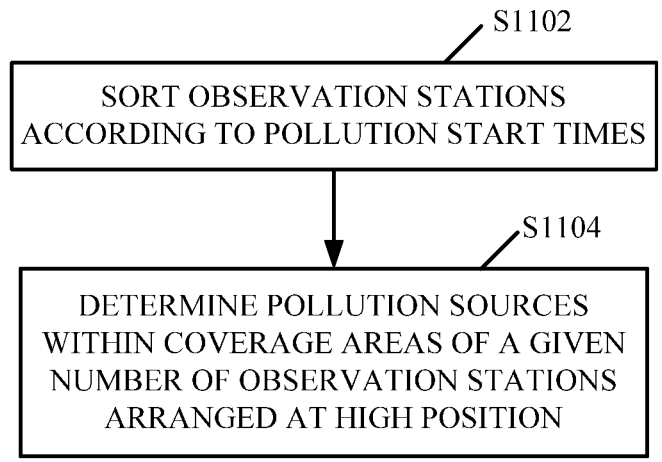
FIG. 11 is a schematic flowchart illustrating still another exemplary process of determining the pollution sources.

FIG. 11 illustrates still another exemplary process of determining the pollution sources. As shown in FIG. 11, at step S1102, the computer system may sort the observation stations associated with the target pollution processes according to the pollution start times of the target pollution processes determined at step S802. In the embodiment, the observation stations may be arranged in the order of the pollution start times. Then at step S1104, the computer system may determine the pollution sources located within the coverage areas of a given number of observation stations which are arranged at high position. For example, the pollution sources located within the coverage areas of the top five observation stations may be determined. The higher position the observation station is arranged at, the more contribution the pollution sources within the coverage area of the observation station made to the pollution.

It can be seen from the above description that the method for pollution source attribution according to the embodiments of the present invention can qualitatively determine main pollution sources from a large number of pollution sources prior to quantitatively analyzing the contribution of each pollution source, thereby reducing the computation time for the pollution source attribution and improving the computation efficiency.

Further, in some embodiments of the invention, the computer system may analyze contributions of the determined pollution sources. The analysis may be performed in the prioritized order of the pollution sources. In some embodiments, only the pollution sources with a high priority may be considered. The pollution sources with the high priority are main pollution sources which influence the pollution significantly, the analysis of the contributions of the main pollution sources may substantially implement the pollution source attribution. The contribution of the pollution source may be computed using any existing method, for example, a Community Multi-scale Air Quality (CMAQ) based method.

By analyzing the contributions of the pollution sources in the prioritized order, the computation time for the pollution source attribution can be reduced and the computation efficiency can be improved.

Figure 12:
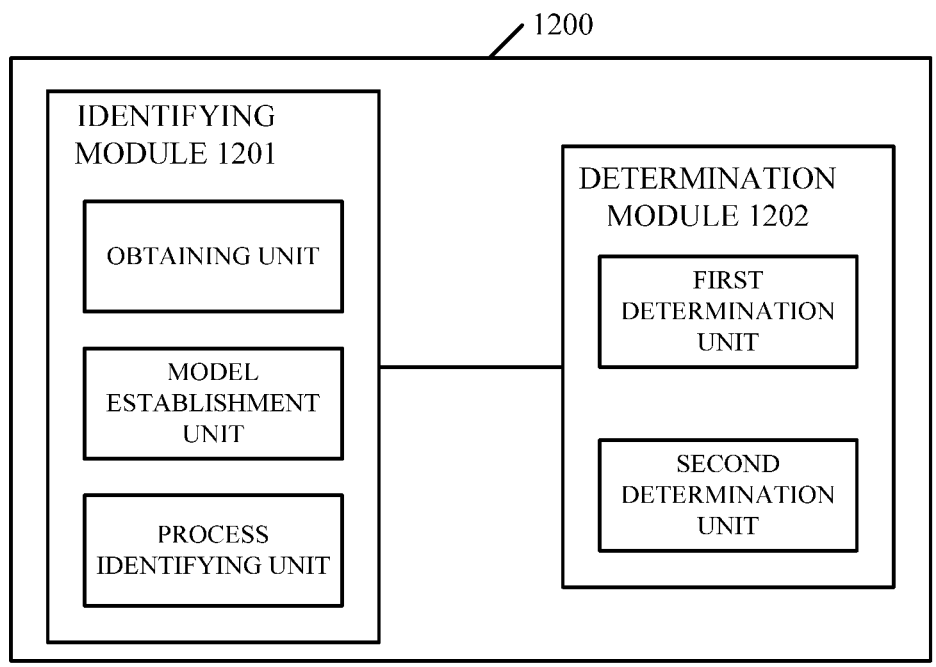
FIG. 12 is a schematic block diagram of the apparatus for pollution source attribution according to an embodiment of the present invention.

FIG. 12 shows a schematic block diagram of the apparatus for pollution source attribution according to an embodiment of the present invention. Hereinafter, this embodiment will be described in detail in conjunction with the accompanying drawing, wherein the description for the parts identical with those of the previous embodiments is appropriately omitted.

As shown in FIG. 12, the apparatus 1200 for pollution source attribution according to this embodiment of the invention may comprise an identifying module 1201, which is configured to identify a plurality of pollution process sets, and a determination module 1202, which is configured to determine pollution sources based on pollution start times of target pollution processes with matched features in the plurality of pollution process sets within a time window.

It should be noted that the apparatus 1200 according to this embodiment may operatively implement the method for pollution source attribution according to the embodiments as shown in FIGS. 2, 3, 5, 7 to 11.

In the identifying module 1201, an obtaining unit may obtain a group of pollution concentration observations from each of a plurality of observation stations, The pollution concentration observation may comprise pollution concentration value and observation time. A model establishment unit may establish, for each group of pollution concentration observations, a pollution curve model which comprises at least one valley point and at least one peak point. Then a process identifying unit may identify at least one pollution process based on the pollution curve model.

It should be noted that the identifying module 1201 may operatively implement the process of identifying the pollution process sets as shown in FIG. 3, and the model establishment unit may operatively implement the process of establishing a pollution curve model as shown in FIG. 5.

In the determination module 1202, a first determination unit may determine the target pollution processes which occurred within the time window and have the matched features from the plurality of pollution process sets. Then a second determination unit may determine the pollution sources based on the pollution start times of the target pollution processes.

It should be noted that the determination module 1202 may operatively implement the process of determining the pollution sources as shown in FIG. 8, and the second determination unit may operatively implement the process of determining the pollution sources as shown in FIG. 9, FIG. 10 or FIG. 11.

Further the apparatus 1200 may comprise an analysis module which is configured to analyze contributions of the determined pollution sources.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 13:
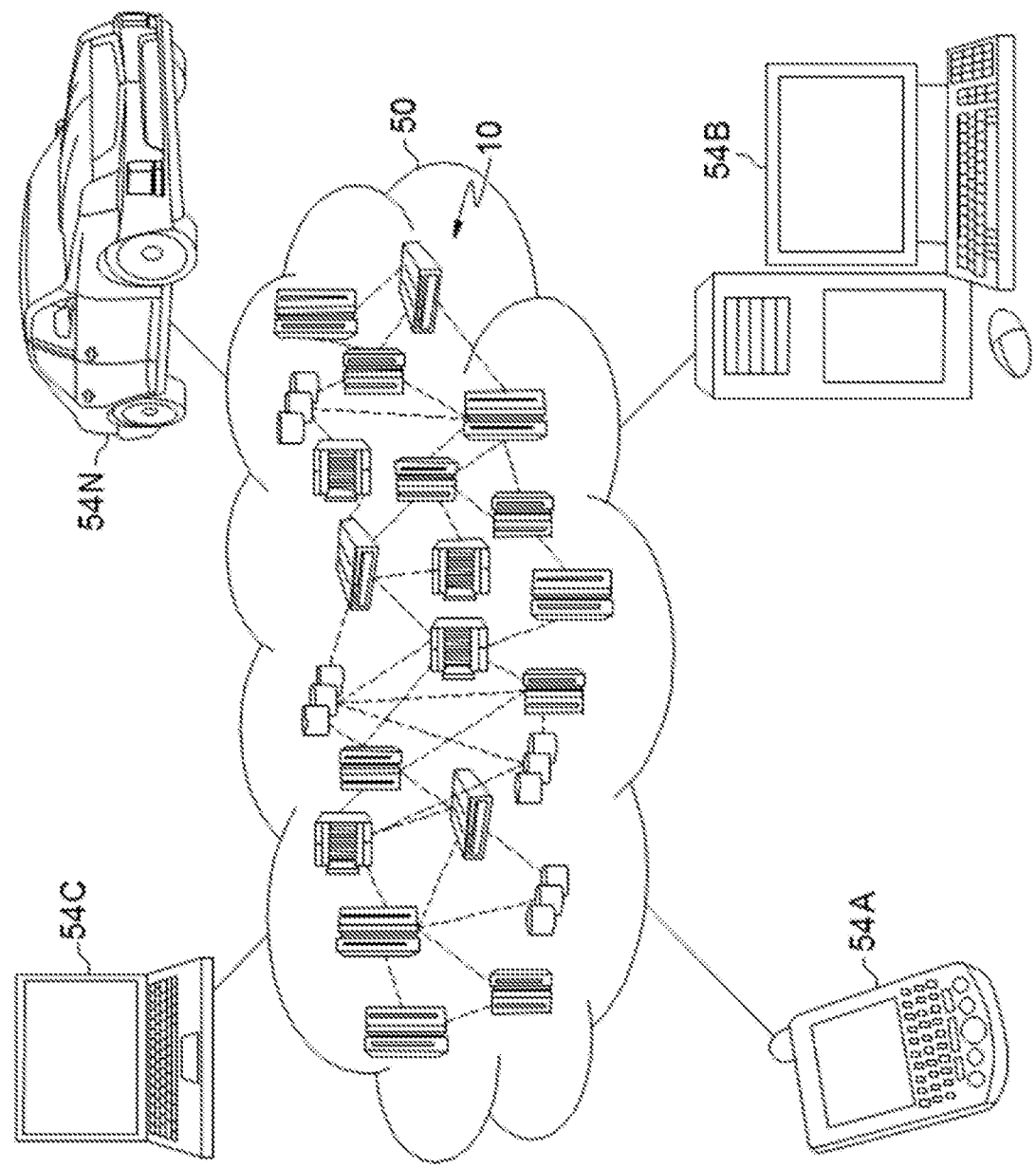
FIG. 13 depicts a cloud computing environment 50 according to an embodiment of the present invention.

Referring now to FIG. 13, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 13 are intended to be illustrative only and that computing nodes 10 and cloud-computing environment 50 can communicate with any type of computerized circuit over any type of network and/or network addressable connection (e.g., using a web browser).

Figure 14:
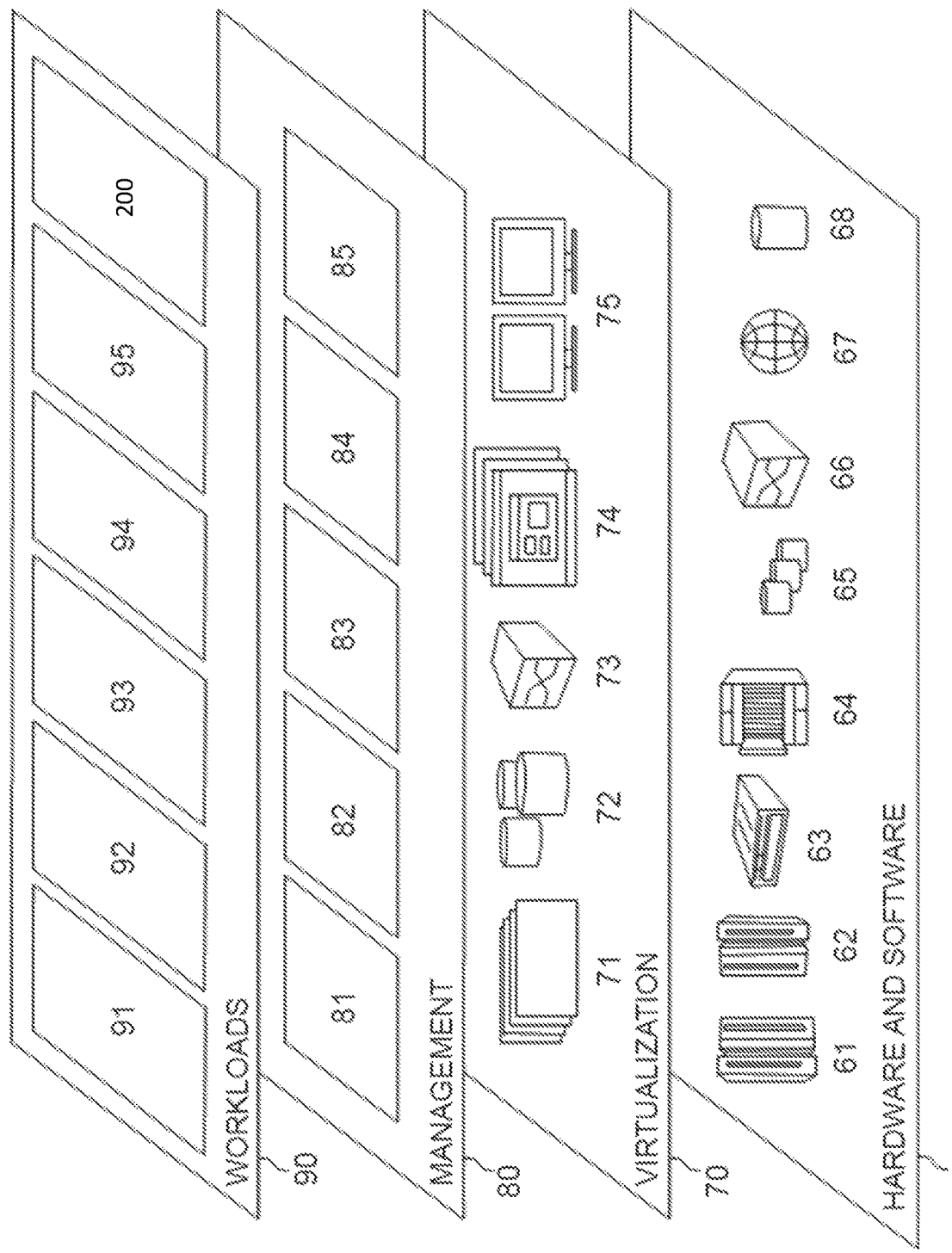
FIG. 14 depicts abstraction model layers according to an embodiment of the present invention.

Referring now to FIG. 14, an exemplary set of functional abstraction layers provided by cloud-computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the method 200.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:
1. A computer-implemented method comprising:
identifying a plurality of pollution process sets via a plurality of observation stations;
determining pollution sources based on pollution start times of target pollution processes with matched features in the plurality of pollution process sets within a time window;
analyzing a pollution migration path for the plurality of pollution process sets based on a plurality of groups of pollution concentration observations from the plurality of observation stations;
separating emission inventory based on the identified pollution migration path; and
performing a calculation with a newly separated and ordered emission inventory as a result of the prior separating and determining to generate a pollution source attribution as the pollution sources, wherein the pollution source attribution comprises which type of pollution attributes to a reason for the pollution start times of target pollution processes that results in the pollution migration path, wherein the target pollution processes with matched features are the pollution processes between which similarity is greater than a predetermined threshold, and wherein, for each of the plurality of pollution process sets, determining pollution processes which overlaps with the time window as, candidate pollution processes, the pollution process which overlaps with the time window includes the pollution process of which the pollution start time falls within the time window and the pollution end time falls outside the time window, then determining the target pollution processes having the matched features from the candidate pollution processes, where the target pollution processes each belongs to different pollution process set.

2. The computer-implemented method according to claim 1, wherein the identifying a plurality of pollution process sets comprises:

obtaining a group of pollution concentration observations from each of the plurality of observation stations, wherein the pollution concentration observation comprises pollution concentration value and observation time;

for the group of pollution concentration observations, establishing a pollution curve model which comprises at least one valley point and at least one peak point; and identifying at least one pollution process based on the pollution curve model, the pollution process starting from a valley point and ending at a peak point following the valley point.

3. The computer-implemented method according to claim 2, wherein the establishing a pollution curve model comprises:

establishing a pollution curve model by performing curve fitting on the group of pollution concentration observations.

4. The computer-implemented method according to claim 2, wherein the establishing a pollution curve model comprises:

establishing a candidate pollution curve model based on the group of pollution concentration observations;

counting extreme points of the candidate pollution curve model;

adapting a degree of the candidate pollution curve model;

estimating parameter values of the adapted candidate pollution curve model;

counting the extreme points of the adapted candidate pollution curve model;

calculating a change in the number of the extreme points between the adapted candidate pollution curve model and its previous candidate pollution curve model; and in response to the change being greater than a threshold, repeatedly performing the degree adaption, the parameter estimation, the counting of the extreme points and the change calculation; or in response to the change being less than or equal to the threshold, determining either of the candidate pollution curve model and the adapted candidate pollution curve model as the pollution curve model.

5. The computer-implemented method according to claim 2, wherein the identifying at least one pollution process based on the pollution curve model further comprises:

tuning the at least one peak point and the at least one valley point of the pollution curve model.

6. The computer-implemented method according to claim 5, wherein the tuning the at least one peak point and the at least one valley point of the pollution curve model comprises:

for each of the at least one peak point,
determining a maximum pollution concentration value in the group of pollution concentration observations within a time period from the previous valley point of the current peak point to the next valley point; and
tuning a value of the current peak point to the maximum pollution concentration value and the time of the current peak point to the observation time of the maximum pollution concentration value; and for each of the at least one valley point,
determining a minimum pollution concentration value in the group of pollution concentration observations within a time period from the previous peak point of the current valley point to the next peak point; and
tuning a value of the current valley point to the minimum pollution concentration value and the time of the current valley point to the observation time of the minimum pollution concentration value.

7. The computer-implemented method according to claim 1, wherein the determining the pollution sources based on the pollution start times of the target pollution processes comprises:

sorting the plurality of observation stations associated with the target pollution processes according to the pollution start times the target pollution processes; and arranging the pollution sources located within coverage areas of the plurality of observation stations in the order of the plurality of observation stations.

8. The computer-implemented method according to claim 1, wherein the determining the pollution sources based on the pollution start times of the target pollution processes comprises:

grouping the plurality of observation stations associated with the target pollution processes into multiple groups of observation stations according to the pollution start times of the target pollution processes;

generating a pollution source group for each of the multiple groups of observation stations, the pollution source group comprising the pollution sources located within coverage areas of the observation stations in the group of observation stations; and arranging the pollution source groups in the order of the pollution start times of the target pollution processes.

9. The computer-implemented method according to claim 1, wherein the determining the pollution sources based on the pollution start times of the target pollution processes comprises:

sorting the plurality of observation stations associated with the target pollution processes according to the pollution start times of the target pollution processes; and determining the pollution sources located within coverage areas of a given number of the observation stations which are arranged at high position.

10. The computer-implemented method according to claim 1 further comprising:

analyzing contributions of the determined pollution sources.

11. The computer-implemented method of claim 1, embodied in a cloud-computing environment.

12. The computer-implemented method according to claim 1, wherein, in the determination, the similarity between the candidate pollution processes of different pollution process sets is calculated, and the target pollution processes are determined based on the calculated similarity, and then obtaining the pollution start times of the target pollution processes.

13. A system comprising:
one or more processors;
a memory coupled to at least one of the processors;
a set of computer program instructions stored in the memory and executed by at least one of the processors in order to perform actions of:
identifying a plurality of pollution process sets via a plurality of observation stations;
determining pollution sources based on pollution start times of target pollution processes with matched features in the plurality of pollution process sets within a time window;
analyzing a pollution migration path for the plurality of pollution process sets based on a plurality of groups of pollution concentration observations from the plurality of observation stations;
separating emission inventory based on the identified pollution migration path; and
performing a calculation with a newly separated and ordered emission inventory as a result of the prior separating and determining to generate a pollution source attribution as the pollution sources,
wherein the pollution source attribution comprises which type of pollution attributes to a reason for the pollution start times of target pollution processes that results in the pollution migration path,
wherein the target pollution processes with matched features are the pollution processes between which similarity is greater than a predetermined threshold, and
wherein, for each of the plurality of pollution process sets determining pollution processes which overlaps with the time window as candidate pollution processes, the pollution process which overlaps with the time window includes the pollution process of which the pollution start time falls within the time window and the pollution end time falls outside the time window, then determining the target pollution processes having the matched features from the candidate pollution processes, where the target pollution processes each below to different pollution process set.

14. The system according to claim 13, wherein the set of computer program instructions is executed by at least one of the processors in order to identify a plurality of pollution, process sets by:
obtaining a plurality of groups of pollution concentration observations from the plurality of observation stations, wherein the pollution concentration observation comprises pollution concentration value and observation time;
for each of the plurality of groups of pollution concentration observations,
establishing a pollution curve model which comprises at least one valley point and at least one peak point; and
identifying at least one pollution process based on the pollution curve model, the pollution process starting from a valley point and ending at a peak point following the valley point.

15. The system according to claim 13, wherein the set of computer program instructions is executed by at least one of the processors in order to determine pollution sources based on pollution start times of target pollution processes with matched features in the plurality of pollution process sets within a time window by:
determining the target pollution processes which occurred within the time window and have the matched features from the plurality of pollution process sets; and
determining the pollution sources based on the pollution start times of the target pollution processes.

16. The system according to claim 15, wherein the set of computer program instructions is executed by at least one of the processors in order to determine the pollution processes which occurred within the time window and have the matched features from the plurality of pollution process sets by:
determining, for each of the plurality of pollution process sets, at least one pollution process which overlaps with the time window, as candidate pollution process;
determining the target pollution processes having the matched features from the candidate pollution processes; and
obtaining the pollution start times of the target pollution processes.

17. A computer program product, the computer program product comprising a computer-readable storage medium having program instructions embodied therewith, the program instructions being executable by a computer to cause the computer to:
identifying a plurality of pollution process sets via a plurality of observation stations;
determining pollution sources based on pollution start times of target pollution processes with matched features in the plurality of pollution process sets within a time window;
analyzing a pollution migration path for the plurality of pollution process sets based on a plurality of groups of pollution concentration observations from the plurality of observation stations;
separating emission inventory based on the identified pollution migration path; and
performing a calculation with a newly separated and ordered emission inventory as a result of the prior separating and determining to generate a pollution source attribution as the pollution sources,
wherein the pollution source attribution comprises which type of pollution attributes to a reason for the pollution start times of target pollution processes that results in the pollution migration path,
wherein the target pollution processes with matched features are the pollution processes between which similarity is greater than a predetermined threshold, and
wherein, for each of the plurality of pollution process sets, determining pollution processes which overlaps with the time window as candidate pollution processes, the pollution process which overlaps with the time window includes the pollution process of which the pollution start time falls within the time window and the pollution end time falls outside the time window, then determining the target pollution processes having the matched features from the candidate pollution processes, where the target pollution processes each belongs to different pollution process set.

* * * * *